May 21, 1935. G. A. LYON 2,001,968
SHOVE DOWN MOLDED TIRE COVER
Filed Dec. 2, 1931
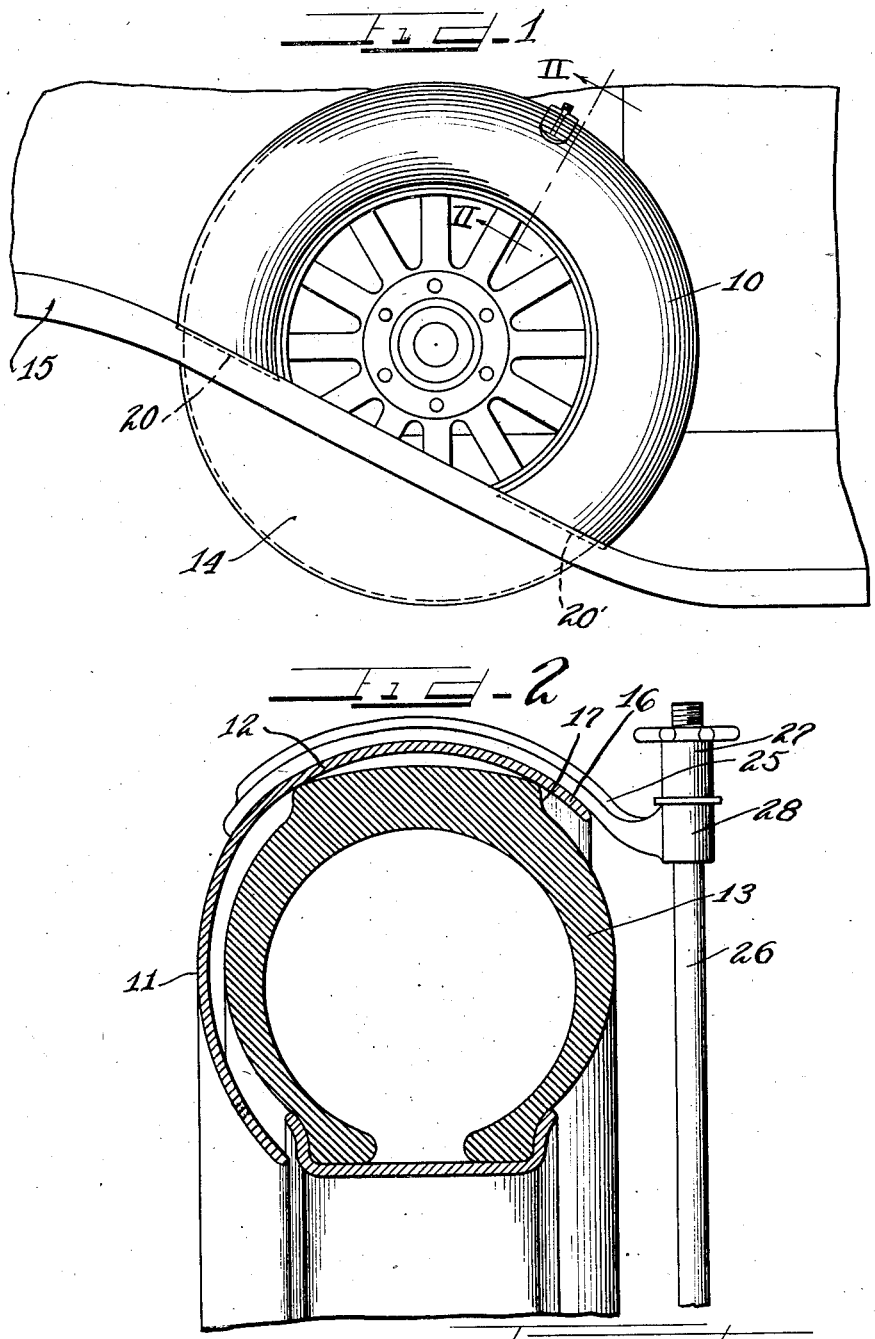
Inventor
George Albert Lyon.

Patented May 21, 1935

2,001,968

UNITED STATES PATENT OFFICE 2,001,968

SHOVE DOWN MOLDED TIRE COVER

George Albert Lyon, Allenhurst, N. J., assignor to Lyon, Incorporated, Asbury Park, N. J., a corporation of Delaware Application December 2, 1931, Serial No. 578,424

3 Claims. (Cl. 150—54)

This invention relates to automobile spare tire covers and more particularly to a relatively rigid non-collapsible cover of arcuate shape adapted to be manually shoved downwardly into proper tire protecting position on a spare tire mounted in a fenderwell of an automotive vehicle.

The object of this invention is to provide an automobile spare tire cover of relatively rigid non-collapsible construction preferably made of a flexible material having the characteristics of rubber which cover is adapted to be manually shoved downwardly into proper tire protecting position on a spare tire.

In accordance with the general features of this invention there is provided an automobile spare tire cover comprising a relatively rigid non-collapsible arcuate member made of flexible material having the characteristics of rubber and including side and rim portions for covering the outer side wall and tread portions respectively of the spare tire; the arcuate member being of sufficient circumferential length to extend around more than one-half the outer periphery of the tire and arranged to have its ends terminate at the opening of the fenderwell.

Other objects and features of this invention will more fully appear from the following detailed description taken in connection with the accompanying drawing which illustrates a single embodiment thereof and in which Figure 1 is a side view of my tire cover showing it applied to an automobile spare tire disposed in a fenderwell of an automotive vehicle, and Figure 2 is an enlarged cross sectional view taken on substantially the line II—II of Figure 1 looking in the direction indicated by the arrow and illustrating the cross section shape of the cover as well as the hold down means for clampingly securing the cover to the spare tire.

The cover of my invention comprises an arcuate or ring-like member 10 made of relatively rigid non-collapsible material such for example as hard rubber, fiber or the like. This arcuate member 10 has such a cross sectional shape as to provide side and rim portions 11 and 12 respectively for covering the exposed outer side wall and tread portions of the spare tire 13 disposed in the fenderwell 14 of the automotive vehicle 15.

It will be noted that the side portion 11 is of sufficient width to extend clear across the width of the outer side wall of the spare tire and that similarly the tread or rim portion 12 is of sufficient width to extend substantially clear across the entire outer periphery or tread of the tire. Both of these portions are convexly curved as will be evident from Figure 2. Furthermore the tread covering portion 12 has its rear side provided with an inwardly extending marginal edge 16 for overhanging the side 17 of the tread of the tire 13. It is this rear marginal edge 16 of the cover which serves to prevent lateral displacement of the cover when it is shoved into proper tire protecting position on the tire 13.

Also it will be noted that the ends 20 and 20' of the arcuate member 10 do not extend clear down into the fenderwell 14 but terminate substantially at the mouth of the fenderwell as is evident from Figure 1. This construction is advantageous in that it enables the cover to be shoved downwardly onto the spare tire without necessitating removal of the tire from the well. Of course it will be obvious that as the cover is shoved downwardly onto the tire its tread portion at its respective ends is flexed so as to enable the cover to clear the widest diameter of the tire over which the cover has to be passed in order for it to be disposed in a proper tire protecting position on the tire.

After the tire cover is in proper tire protecting position on the spare tire 13 the curved clamping arm 25 may be swung over the tire cover into the position shown in Figure 2 in which it engages the top of the tread portion 12 of the cover. This clamping arm 25 is pivotally supported upon a rod 26 carried by the motor vehicle at the rear of the spare tire 13. Also the upper end of the rod 26 is threaded and has threaded thereon a clamping nut 27 adapted to be forced downwardly into engagement with the hub portion 28 of the clamping arm to tightly secure the clamping arm in proper engagement with the tire cover as shown in Figure 2. It is of course to be understood that if it is desired the clamping nut 27 may embody locking means such as is commonly used in conventional clamping devices of this character now in use with spare wheels on automobiles.

Now I desire it understood that although I have illustrated and described in detail the preferred embodiment of the invention, the invention is not to be thus limited but only insofar as defined by the scope and spirit of the appended claims.

I claim as my invention:

1. In combination with an automobile fenderwell carrying a spare tire, a cover for the tire comprising a member made of non-metallic flexible form retaining material such as rubber and being of an arcuate form corresponding with that of a tire, and of a circumferential extent in excess of 180° and substantially less than 360°, said member comprising a side portion and a rim portion for covering portions of a side wall and the tread of the tire, the free margin of the rim portion extending radially inward of the tire tread and being flexible whereby the same may be flexed outwardly to clear the tread and permit ready application and removal of the cover with a substantially transverse movement of the cover in each case, the ends of said member terminating at the mouth of the well, the rim portion being flexible and having a normal diameter which is less than the diameter of the tire at its tread, whereby said member holds itself on the tire when in proper tire protecting position.

2. A tire cover comprising a member made of non-metallic flexible form retaining material such as rubber and being of an arcuate form of between 180° and 360° in extent, comprising side and rim portions for covering side wall and tread portions of an automobile spare tire, the margin of the rim portion normally extending radially inwardly of the tread of the tire when in proper protecting position and being flexible whereby the same may be flexed to clear the tread to allow the cover to be applied to and removed from the tire, said margin, when on the tire, being spaced therefrom sufficiently to enable said margin to be grasped by the fingers for the purpose of flexing the same.

3. A cover for a spare tire of an automobile comprising a member made of non-metallic flexible form retaining material such as rubber and being of an arcuate form and having a circumferential extent of between 180° and 360°, said member having a normal diameter which is less than that of the tire to be covered thereby, to thereby hold the cover in proper tire protecting position on the tire, said member being constructed and arranged so that its ends are movable transversely of the member about an intermediate portion thereof to clear the tire tread and thereby enable the cover to be removed from the tire with a substantially single movement transversely of the tire.

GEORGE ALBERT LYON.